# 3,072,669
ORGANOPHOSPHORUS DERIVATIVES OF 1,2,3-THIADIAZOLE

Richard L. McConnell and Harry W. Coover, Jr., Kingsport, Tenn., assignors to Eastman Kodak Company, Rochester, N.Y., a corporation of New Jersey
No Drawing. Filed Mar. 28, 1960, Ser. No. 17,761
6 Claims. (Cl. 260—302)

This invention relates to new organophosphorus compounds.

It is an object of this invention to provide a new class of organophosphorus compounds.

It is another object of this invention to provide novel insecticides.

These and other objects of the invention will be apparent from the description which follows.

The compounds of the invention have the following structure:

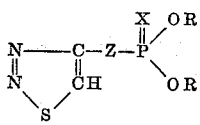

wherein Z is a divalent radical having the structure

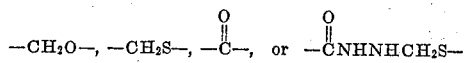

X is an oxygen atom or a sulfur atom, and R is a lower alkyl radical suitably having 1 to 8 carbon atoms and preferably 1 to 3 carbon atoms. Representative alkyl radicals for the substituent R include ethyl, isopropyl, butyl, isobutyl, 2-ethylhexyl and the like.

The compounds of this invention are prepared by the reaction of 1,2,3-thiadiazoles of the general formula

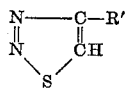

where R' may be a monovalent radical having the structure

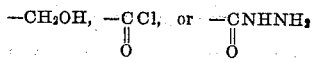

depending upon the specific compound to be prepared, with certain reactive organophosphorus intermediates. The 1,2,3-thiadiazoles needed as intermediates can be prepared from 1,2,3-thiadiazole-4-carboxylic acid, the preparation of which is described by Hurd and Mori in J.A.C.S. 77, 5359 (1955) and may be illustrated by the following equation:

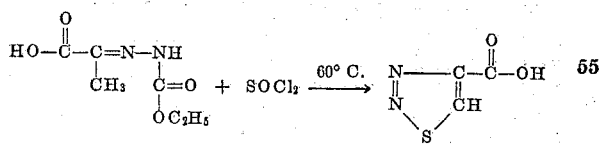

This acid may be converted to the acid chloride

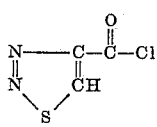

by refluxing in excess thionyl chloride and to the hydrazide

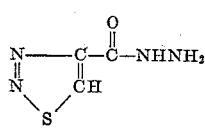

by treatment with hydrazine. The methyl ester of 1,2,3-thiadiazole-4-carboxylic acid may be reduced with lithium aluminum hydride or potassium borohydride to the corresponding alcohol.

Organophosphorus intermediates which can be used include

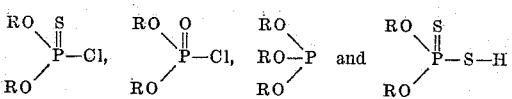

the R being a lower alkyl radical as defined above. The novel products are formed by reaction of the phosphorus intermediate with the appropriate 1,2,3-thiadiazole with the liberation of a molecule of hydrogen chloride, alkyl chloride or water. For example,

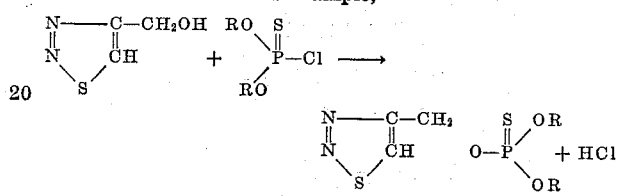

and

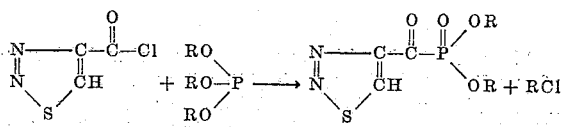

The appropriate aldehyde can be used to add a methylene group or methylene groups, an illustrative reaction being

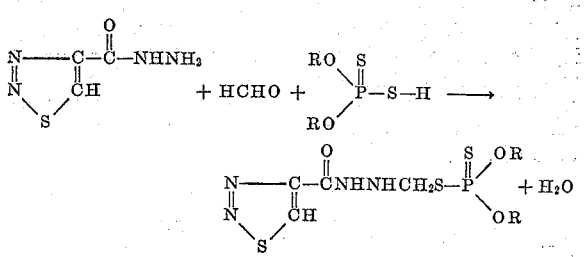

It is also possible to use additionally an organic salt-forming amine such as pyridine to absorb the liberated HCl. The respective organophosphorus intermediates used can be prepared in accordance with the following equations:

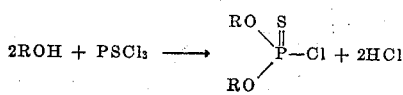

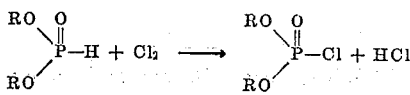

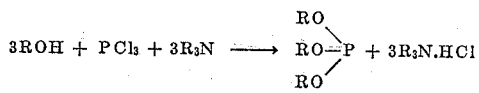

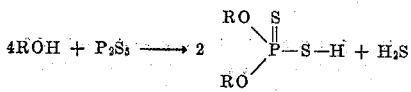

The preferred temperature range for conducting reactions involved in the preparation of the compounds of this invention is 0–150° C. and the preferred duration 1–16 hours, although such reaction conditions can be varied in accordance with usual practice. We have found that the best results are attained by the use of equimolar quantities of reactants, although non-stoichiometric proportions can be suitably employed.

The compounds of the invention have utility as insecticides, particularly as aphicides and miticides. In accordance with usual practice, when the compounds of the invention are used as insecticides, these compounds are generally utilized in diluted form, typically in solutions, dispersions, emulsions or the like. Likewise, various well known dry, inert carriers or diluents can be utilized with the insecticides of the invention. Typically, the compounds of the invention are diluted to a useful insecticidal concentration of about 10 to 250 p.p.m., broadly varied in accordance with usual practice. In addition, the compounds of the invention have utility as chemical intermediates.

The following examples are illustrative of the compounds of this invention, their method of preparation, and their utility as insecticides.

EXAMPLE 1

*O,O Diethyl 1,2,3-Thiadiazol-4-Ylmethyl Phosphorothionate*

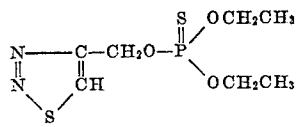

0.2 mole of 1,2,3-thiadiazole -4-methanol and 0.2 mole of pyridine were dissolved in 200 ml. of toluene, and to this solution was added dropwise with stirring 0.2 mole of diethyl phosphorochloridothionate dissolved in 25 ml. of toluene. The reaction mixture was heated on the steam bath with stirring for 4 hours, after which the precipitated pyridine hydrochloride was filtered off and the toluene solution washed twice with 100 ml. of water. After drying the toluene solution over sodium sulfate, the solvent was removed by distilling in vacuo, leaving the 0,0-diethyl 1,2,3-thiadiazol-4-ylmethyl phosphorothionate product as a yellow oil. The reaction took place in accordance with the following equation.

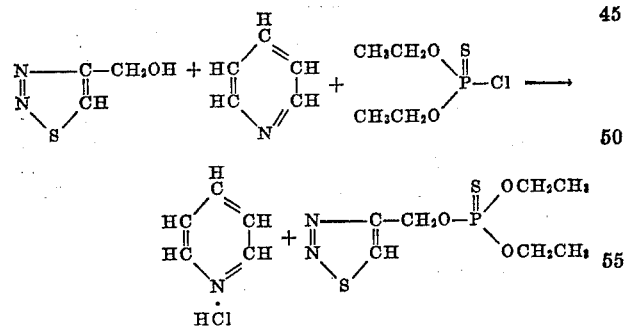

EXAMPLE 2

*Diethyl 1,2,3-Thiadiazol-4-Ylcarbonylphosphonate*

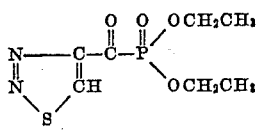

0.5 mole of 1,2,3-thiadiazol-4-carbonyl chloride was mixed with 50 ml. of benzene. 0.5 mole of triethyl phosphite was next added dropwise with stirring over a 30-minute period. The benzene solution was then refluxed gently until 0.5 mole of ethyl chloride had been condensed in a dry ice trap. The diethyl 1,2,3-thiadiazol-4-ylcarbonylphosphonate was purified by molecular distillation with the temperature up to 95° C. and the pressure down to 3 microns yielding a pale yellow oil. The product resulted from the following reaction:

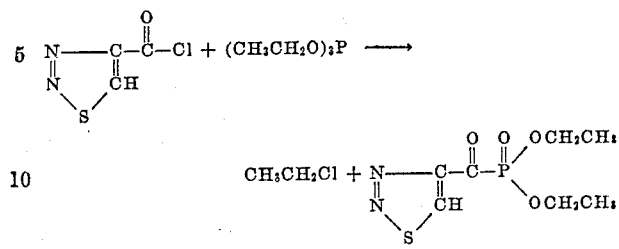

EXAMPLE 3

*O,O-Dimethyl S(1,2,3-Thiadiazol-4-Ylcarbonylhydrazomethyl) Phosphorothiolothionate*

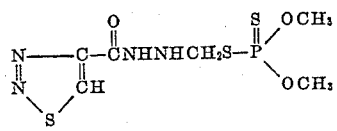

0.3 mole of 1,2,3-thiadiazol-4-carbohydrazide, 0.3 mole of formaldehyde (formalin) and 0.3 mole of dimethyl phosphorothiolothionate were placed in 250 ml. of benzene and refluxed on the steam bath for 6 hours. The water and benzene present were removed by stripping the reaction mixture in vacuo, leaving the 0,0-dimethyl S(1,2,3 - thiadiazol - 4 - ylcarbonylhydrazomethyl) phosphorothiolothionate as a viscous oil. The reaction may be illustrated by the following equation:

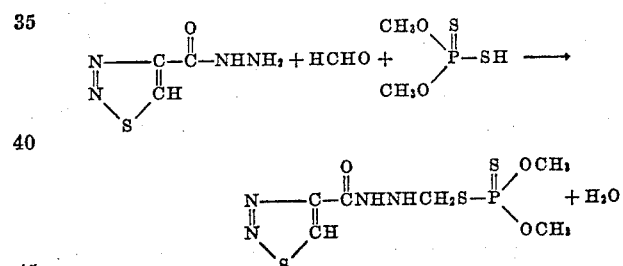

EXAMPLE 4

*O,O-Dimethyl 1,2,3-Thiadiazol-4-Ylmethyl Phosphate*

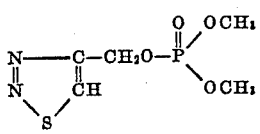

Equimolar portions (0.5 mole) of 1,2,3-thiadiazol-4-methanol, pyridine, and dimethyl phosphorochloridate were reacted in toluene solution in accordance with the procedure of Example 1 to produce 0,0-dimethyl 1,2,3-thiadiazol-4-ylmethyl phosphate as a yellow oil. The reaction was carried out as follows:

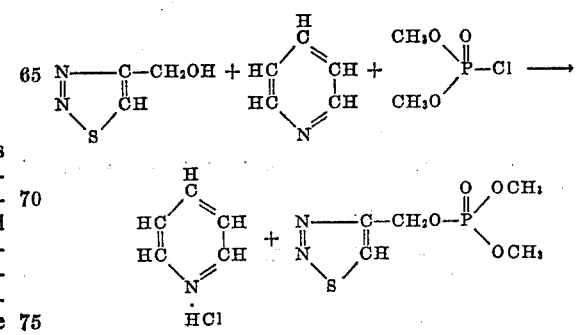

EXAMPLE 5

O,O-Diisopropyl 1,2,3-Thiadiazol-4-Ylmethyl Phosphorothionate

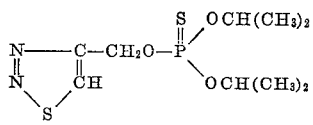

This product was prepared as a viscous oil by reacting 0.2 mole of 1,2,3-thiadiazole-4-methanol, 0.2 mole of triethylamine and 0.2 mole of diisopropyl phosphorochloridothionate in accordance with the procedure of Example 1, with the exception that benzene solution was used in place of toluene. The reaction proceeded as follows:

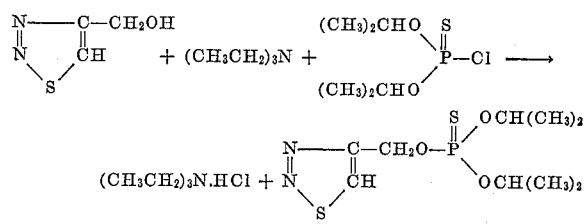

EXAMPLE 6

Use of Compounds as Insecticides

Tests against mites were carried out in the following manner. A control and acetone solutions containing 1% of each of the products prepared in Examples 1–5 were prepared and diluted with water to give solutions of the desired concentration for testing. Two heavily infested bean leaves containing adult two-spotted mites (*Tetranychus bimaculatus* Harvey) were carefully dipped in the above solutions and dried in a gentle air stream. The leaves were then placed on damp paper toweling in Petri dishes and observed after 24 hours for mortality among the adult mites. The results of these tests are given in the following table:

| Toxicant | Concentration in p.p.m. | Percent Killed Mites |
|---|---|---|
| Control (acetone-water solution) | 0 | 0 |
| O,O-Diethyl 1,2,3-thiadiazol-4-ylmethyl phosphorothionate | 100 | 100 |
| Diethyl 1,2,3-thiadiazole-4-ylcarbonylphosphonate | 100 | 100 |
| O,O-Dimethyl S(1,2,3-thiadiazol-4-ylcarbonylhydrazomethyl) phosphorothiolothionate | 100 | 100 |
| O,O-Dimethyl 1,2,3-thiadiazol-4-ylmethyl Phosphate | 100 | 100 |
| O,O-Diisopropyl 1,2,3-thiadiazol-4-ylmethyl Phosphorothionate | 100 | 100 |

Although the invention has been described in considerable detail with reference to certain preferred embodiments thereof, it will be understood that variations and modifications can be effected within the spirit and scope of the invention as described hereinabove and as defined in the appended claims.

We claim:

1. As a composition of matter, O,O-diethyl 1,2,3-thiadiazol-4-ylmethyl phosphorothionate having the formula:

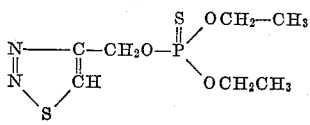

2. As a composition of matter, diethyl 1,2,3-thiadiazol-4-ylcarbonylphosphonate having the formula:

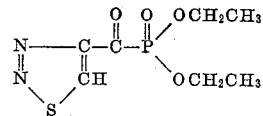

3. As a composition of matter, O,O-dimethyl S(1,2,3-thiadiazol - 4 - ylcarbonylhydrazomethyl)phosphorothiolothionate having the formula:

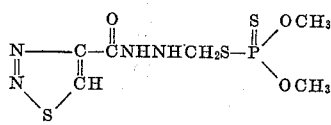

4. As a composition of matter, O,O-dimethyl 1,2,3-thiadiazol-4-ylmethyl phosphate having the formula:

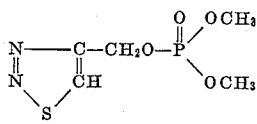

5. As a composition of matter, O,O-diisopropyl 1,2,3-thiadiazol-4-ylmethyl phosphorothionate having the formula:

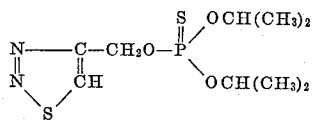

6. Organophosphorus compounds having the formula:

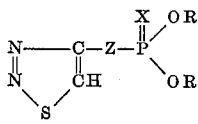

wherein R is lower alkyl, Z is divalent having a formula selected from the group consisting of

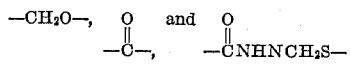

and X is selected from the group consisting of oxygen and sulfur.

References Cited in the file of this patent

UNITED STATES PATENTS

| | | |
|---|---|---|
| 2,209,092 | Price et al. | July 23, 1940 |
| 2,516,313 | Goddin et al. | July 25, 1950 |
| 2,545,283 | Johnson | Mar. 13, 1951 |

FOREIGN PATENTS

| | | |
|---|---|---|
| 713,278 | Great Britain | Aug. 11, 1954 |

OTHER REFERENCES

Frear et al.: J. of Economic Entomology, vol. 40, pp. 736–41 (1947).

Bambas: The Chem. of Heterocyclic Compounds (Interscience), p. 5, 9 (1952).